(12) United States Patent
Mori et al.

(10) Patent No.: US 10,377,427 B2
(45) Date of Patent: Aug. 13, 2019

(54) INSTRUMENT PANEL REINFORCEMENT

(71) Applicant: AISIN SEIKI KABUSHIKI KAISHA, Kariya-shi, Aichi-ken (JP)

(72) Inventors: Syunji Mori, Kariya (JP); Takanobu Kaneko, Nantong (CN); Yasuhisa Tsuchida, Nishio (JP); Kiyoichi Kita, Okazaki (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/928,875

(22) Filed: Mar. 22, 2018

(65) Prior Publication Data
US 2018/0273112 A1 Sep. 27, 2018

(30) Foreign Application Priority Data

Mar. 23, 2017 (JP) .................................. 2017-057058

(51) Int. Cl.
*B62D 25/14* (2006.01)
*B62D 29/00* (2006.01)
*B62D 27/06* (2006.01)

(52) U.S. Cl.
CPC ......... *B62D 25/145* (2013.01); *B62D 29/001* (2013.01); *B60Y 2410/122* (2013.01); *B62D 27/065* (2013.01)

(58) Field of Classification Search
CPC .................................................. B62D 25/145
USPC ............................................. 296/193.02, 70
See application file for complete search history.

(56) References Cited

U.S. PATENT DOCUMENTS

| | | | | |
|---|---|---|---|---|
| 8,029,045 B2* | 10/2011 | Merkle | ................ | B62D 25/145 296/193.02 |
| 8,919,855 B2* | 12/2014 | Ruiz Rincon | ........ | B62D 25/145 296/193.02 |
| 2004/0135400 A1* | 7/2004 | Matsuzaki | ........ | B29C 45/14598 296/193.02 |
| 2004/0150251 A1* | 8/2004 | Matsutani | ............ | B62D 25/142 296/193.02 |
| 2013/0026798 A1* | 1/2013 | Meier | .................. | B62D 25/145 296/205 |
| 2018/0194397 A1* | 7/2018 | Someya | ................. | B62D 21/15 |

FOREIGN PATENT DOCUMENTS

| | | |
|---|---|---|
| JP | 2011-189806 | 9/2011 |
| JP | 2014-223894 | 12/2014 |

* cited by examiner

*Primary Examiner* — Jason S Morrow
(74) *Attorney, Agent, or Firm* — Finnegan, Henderson, Farabow, Garrett & Dunner, LLP

(57) ABSTRACT

An instrument panel reinforcement includes a cylindrical-shaped portion being formed as a single piece, being disposed at a driver's seat side, and extending in a vehicle width direction, and a groove-shaped portion being disposed at a front passenger's seat side, extending in the vehicle width direction, and opening in a predetermined direction. The instrument panel reinforcement is provided for a vehicle. The groove-shaped portion includes a reinforcement member being made of synthetic resin and mounted on a predetermined part of the groove-shaped portion, the part being away from the cylindrical-shaped portion by a predetermined distance.

4 Claims, 7 Drawing Sheets

INSTRUMENT PANEL REINFORCEMENT

CROSS REFERENCE TO RELATED APPLICATIONS

This application is based on and claims priority under 35 U.S.C. § 119 to Japanese Patent Application 2017-057058, filed on Mar. 23, 2017, the entire content of which is incorporated herein by reference.

TECHNICAL FIELD

This disclosure generally relates to an instrument panel reinforcement.

BACKGROUND DISCUSSION

A known instrument panel reinforcement supporting interior parts constituting an instrument panel of a vehicle is disclosed in JP2011-189806A (hereinafter referred to as Patent reference 1). Generally, the weight of a part of the interior parts constituting the instrument panel of the vehicle disposed at a front passenger's seat side (a passenger's seat side next to a driver's seat side) is lighter than that of a part disposed at the driver's seat side. Accordingly, the strength of the part of the instrument panel reinforcement disposed at the front passenger's seat side does not have to be as strong as the part disposed at the driver's seat side. Here, in Patent reference 1, the part of the instrument panel reinforcement disposed at the front passenger's seat side is formed thinner than the part disposed at the driver's seat side.

The weights of the plural interior parts mounted on the part of the instrument panel reinforcement disposed at the front passenger's seat side differ from one another. Thus, it is favorable that a part where relatively heavy interior parts are mounted, or a part in the vicinity of the part where the relatively heavy interior parts are mounted, includes the strength that is set relatively high. The part of the instrument panel reinforcement disclosed in Patent reference 1 is formed by the bending of a plate member into a cylindrical shape. Accordingly, it is difficult to set the part or the part in the vicinity of the part where the relatively heavy interior parts are mounted to include the strength higher than other parts. That is, an outer diameter and a plate thickness of the part disposed at the driver's seat side are unchanged in a longitudinal direction, and the strength of the part disposed at the front passenger's seat side is unchanged in the longitudinal direction. In addition, for example, it is difficult to set the strength of a local part disposed at a front of a passenger high so as to protect the passenger when the vehicle collides. Accordingly, in the instrument panel reinforcement disclosed in Patent reference 1, the outer diameter and the plate thickness of the whole parts disposed at the front passenger's seat side are set focusing on that the strength is required to be set relatively high. That is, the outer diameter and the plate thickness of the part are set unnecessarily high even for the part strength of which does not have to be set high. Accordingly, the weight of the part disposed at the front passenger's seat side unnecessarily increases.

A need thus exists for an instrument panel reinforcement which is not susceptible to the drawback mentioned above.

SUMMARY

According to an aspect of this disclosure, an instrument panel reinforcement includes a cylindrical-shaped portion being formed as a single piece, being disposed at a driver's seat side, and extending in a vehicle width direction, and a groove-shaped portion being disposed at a front passenger's seat side, extending in the vehicle width direction, and opening in a predetermined direction. The instrument panel reinforcement is provided for a vehicle. The groove-shaped portion includes a reinforcement member being made of synthetic resin and mounted on a predetermined part of the groove-shaped portion, the part being away from the cylindrical-shaped portion by a predetermined distance.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
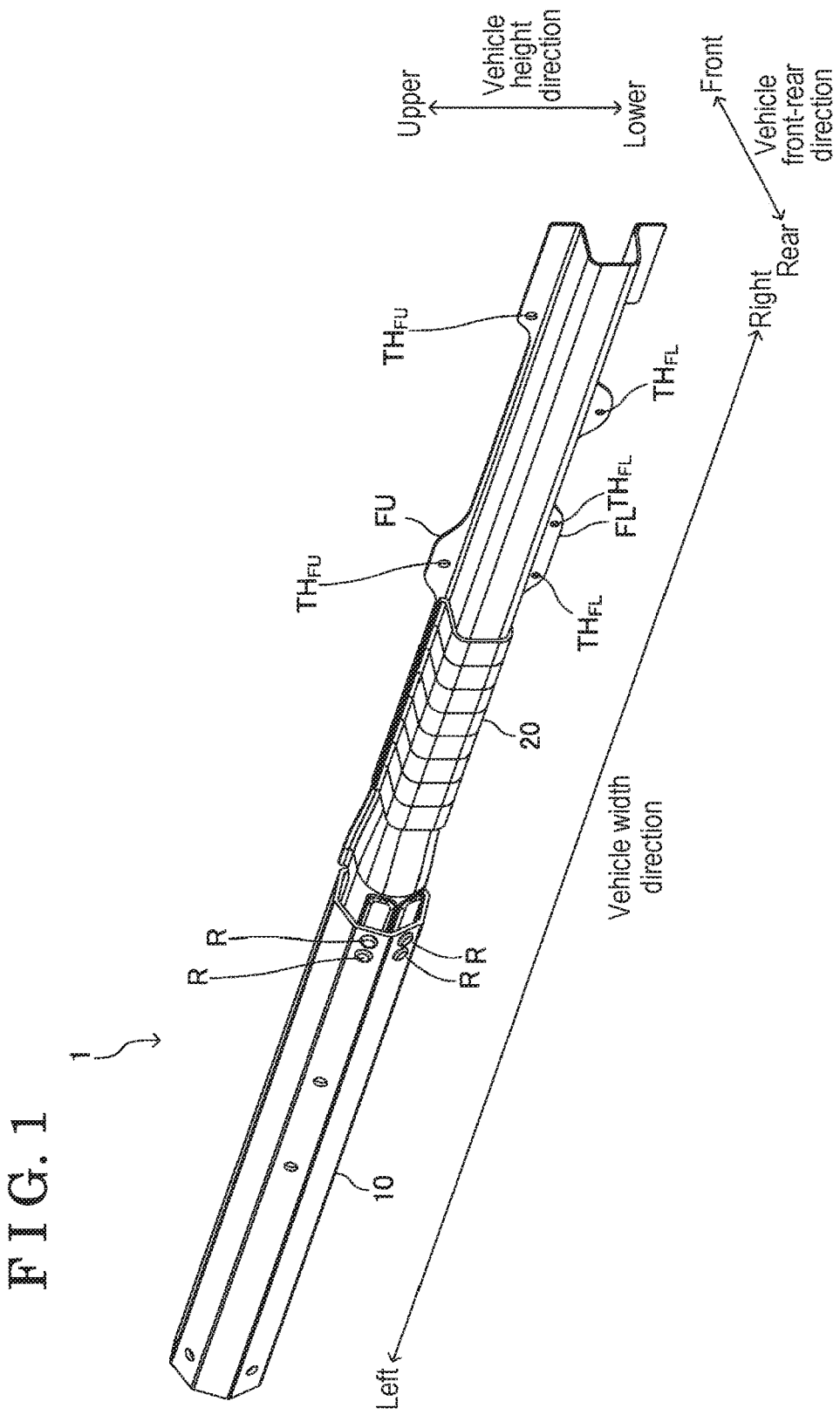
FIG. 1 is a perspective view of an instrument panel reinforcement according to an embodiment disclosed here.

An instrument panel reinforcement 1 of an embodiment of the disclosure will hereunder be explained. As illustrated in FIG. 1, the instrument panel reinforcement 1 extendingly disposed in a vehicle width direction. The instrument panel reinforcement 1 is provided over front pillars that are provided at the right and left of the vehicle. The instrument panel reinforcement 1 supports interior parts (for example, steering related parts, and audio related parts) constituting an instrument panel of a vehicle.

Figure 2:
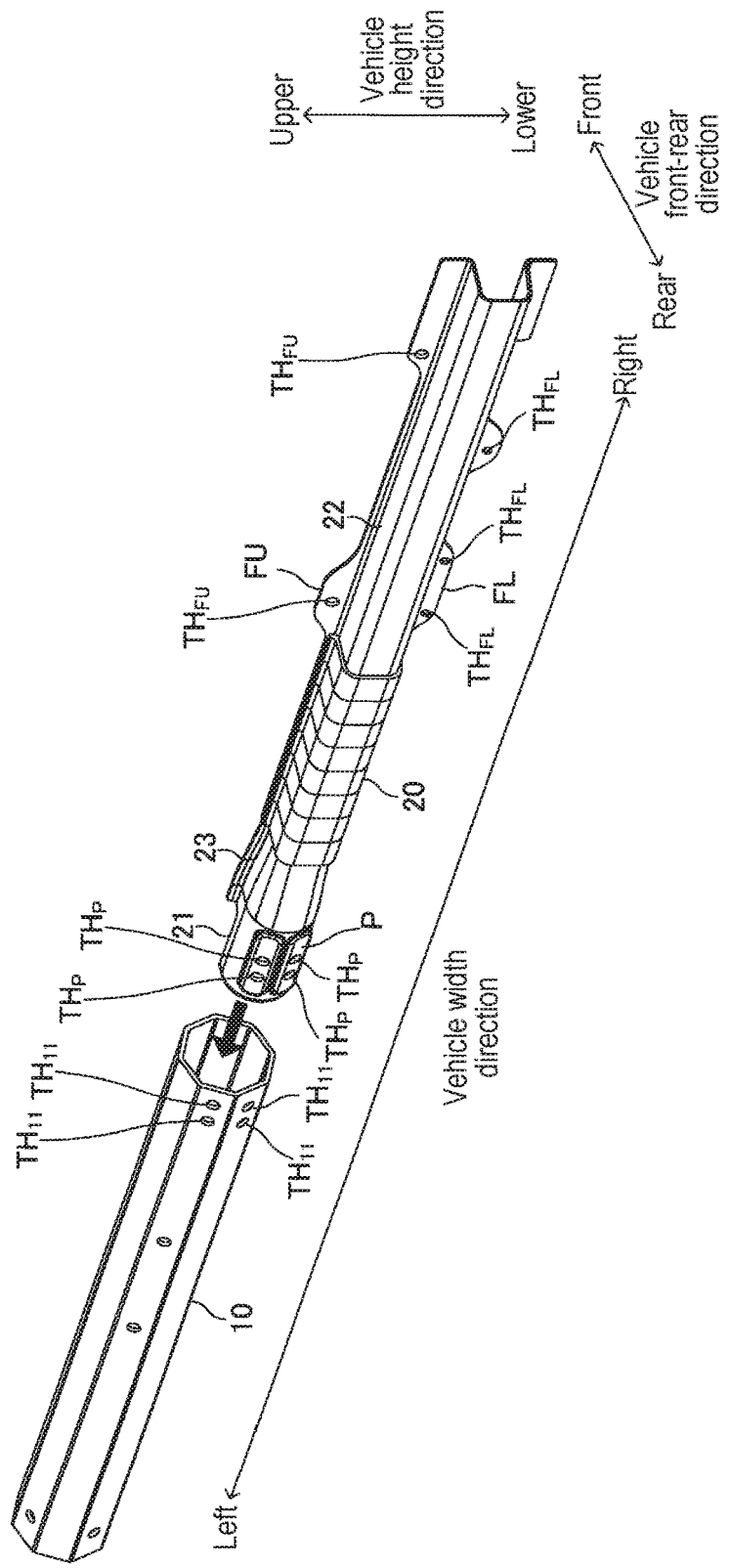
FIG. 2 is; an exploded perspective view of the instrument panel reinforcement in FIG. 1.

As illustrated in FIG. 2, the instrument panel reinforcement 1 includes a cylindrical-shaped portion 10 and a groove-shaped portion 20 each extending in the vehicle width direction. The cylindrical-shaped portion 10 and the groove-shaped portion 20 are made from an aluminum alloy material. An end portion (a right end portion in the embodiment) of the cylindrical-shape portion 10 in a longitudinal direction and an end portion (a left end portion in the embodiment) of the groove-shaped portion 20 in the longitudinal direction are connected to each other to form the instrument panel reinforcement 1. The cylindrical-shaped portion 10 is disposed at a driver's seat side (the left side in the embodiment), and the groove-shaped portion 20 is disposed at a front passenger's seat side (the right side in the embodiment). That is, a connection portion of the cylindrical-shaped portion 10 and the groove-shaped portion 20 is disposed at a front of a border of the driver's seat and the front passenger's seat.

Figure 3:
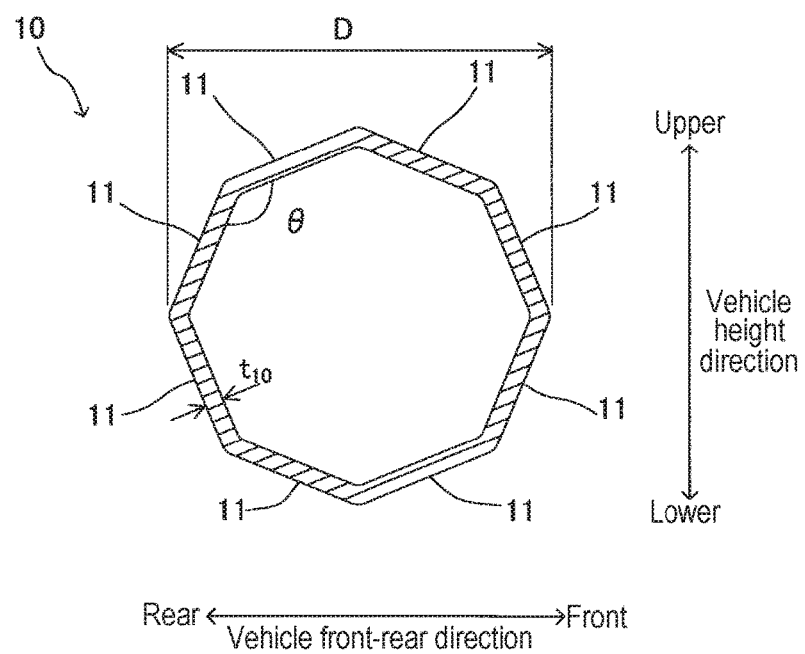
FIG. 3 is a perpendicular cross sectional view of a cylindrical portion in a longitudinal direction.

The cylindrical-shaped portion 10 is formed as a single piece by an extrusion molding method. A cross-sectional outer shape of the cylindrical-shaped portion 10 which is perpendicular to the longitudinal direction is, for example, a regular octagon (see FIG. 3). That is, the cylindrical-shaped portion 10 includes eight side wall portions 11 that each is formed in a rectangular shape and that extends in the vehicle width direction. An angle θ defined between the side wall portions 11 next to each other is set at 135 degrees. An outer diameter D of the cylindrical-shaped portion 10 is, for example, 70 millimeter, or 70 mm. A plate thickness $t_{10}$ of the cylindrical-shaped portion 10 is, for example, 2.6 mm. The cylindrical-shaped portion 10 includes a through hole into which a fastener (for example, a screw and a rivet) for fixing the interior parts is inserted. Specifically, the right end portion of the cylindrical-shaped portion 10 includes plural through holes $TH_{11}$ into which fasteners for connecting the groove-shaped portion 20 are inserted (see FIGS. 1 and 2). The through hole $TH_{11}$ is provided at each of the two side wall portions 11, 11 that are disposed next to each other.

The groove-shaped portion 20 is made from a longitudinal plate that is pressed. The groove-shaped portion 20 extends in the vehicle width direction and opens frontward. The groove-shaped portion 20 is formed thinner than the cylindrical-shaped portion 10. That is, the groove-shaped portion 20 includes a diameter that is smaller than a diameter of the cylindrical-shaped portion 10. The groove-shaped portion 20 includes a first part 21, a second part 22, and a third part 23 (see FIGS. 4 and 5).

The first part 21 extends in the vehicle width direction and opens frontward. The first part 21 is arranged at the left end portion of the groove-shaped portion 20. Specifically, the first part 21 is inserted into the end portion (the right end portion) of the cylindrical-shaped portion 10 that is disposed at a side where the front passenger's seat is arranged, and is connected to the cylindrical-shaped portion 10. A groove width $w_{21}$ and a groove depth $d_{21}$ of the first part 21 are substantially constant, or unchanged in the vehicle width direction (see FIG. 6). The groove width $w_{21}$ and the groove depth $d_{21}$ of the first part 21 are less than the inner diameter of the cylindrical-shaped portion 10. The first part 21 includes a bottom wall portion 211 and first and second side wall portions 212, 213.

The bottom wall portion 211 is configured by two bottom wall portions, a first bottom wall portion 211U and a second bottom wall portion 211L. The first bottom wall portion 211U and the second bottom wall portion 211L are parallel to the two side wall portions 11, 11 of the cylindrical-shaped portion 10, respectively. The two side wall portions 11, 11 of the cylindrical-shaped portion 10 are disposed next to each other. The first bottom wall portion 211U and the second bottom wall portion 211L each is provided with a protrusion P protruding to a vehicle compartment side (rearward). Bottom surfaces of the protrusions P, P are formed in a flat surface shape, and are respectively parallel to the side wall portions 11, 11 that are disposed next to each other. Bottom wall portions of the protrusions P are provided with plural through holes $TH_P$, respectively (see FIG. 4). The plural through holes $TH_P$ correspond to the through holes $TH_{11}$ of the cylindrical-shaped portion 10, respectively.

Figure 6:
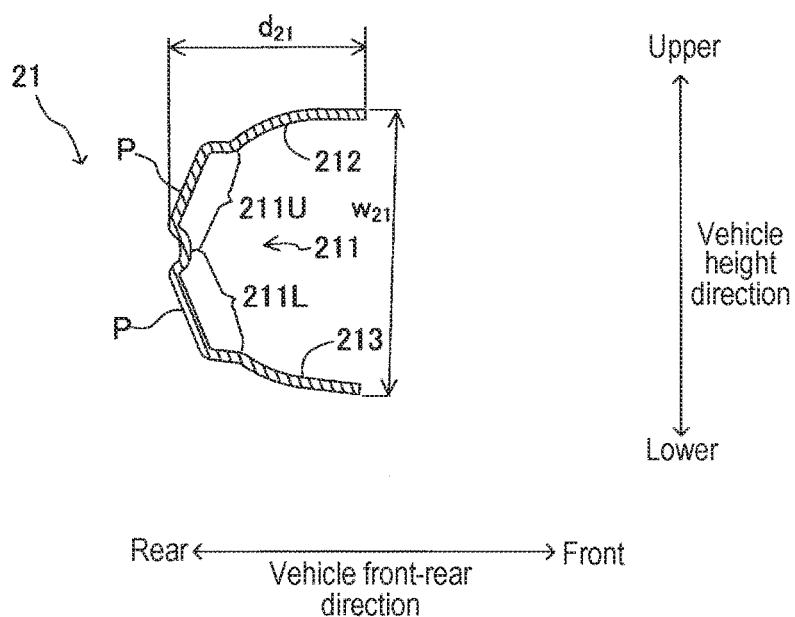
FIG. 6 is a perpendicular cross section of a first part of the groove-shaped portion in the longitudinal direction.

The first side wall portion 212 extends frontward from an upper end portion of the first bottom wall portion 211U (see FIG. 6). The second side wall portion 213 extends frontward from a lower end portion of the second bottom wall portion 211L.

Figure 4:
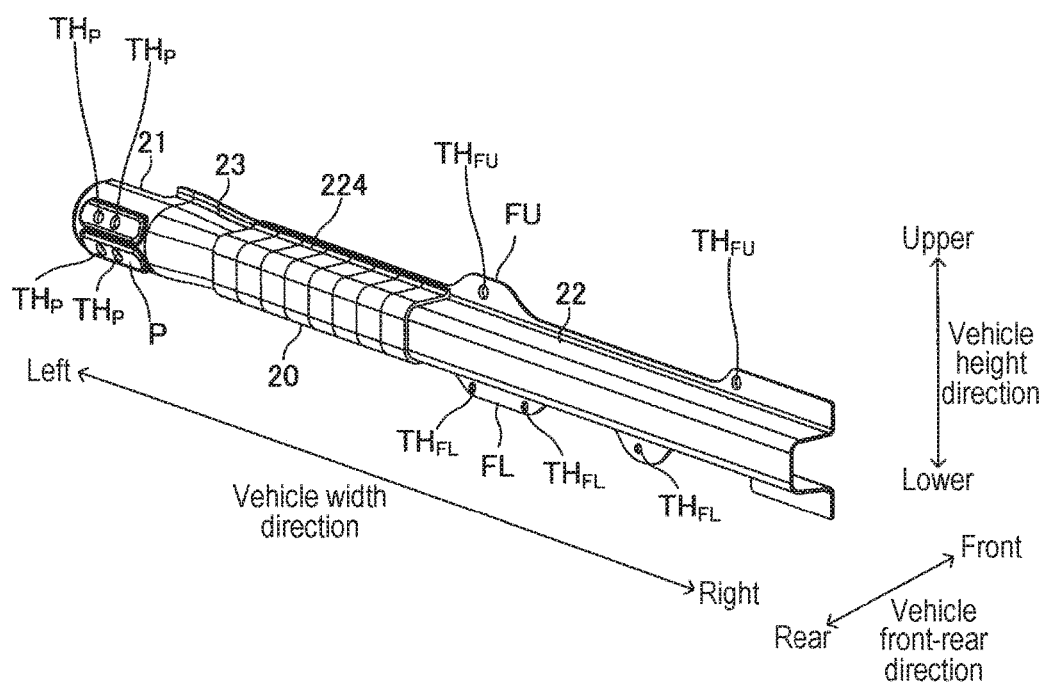
FIG. 4 is a perspective view of a groove-shaped portion as seen from obliquely rearward.
Figure 5:
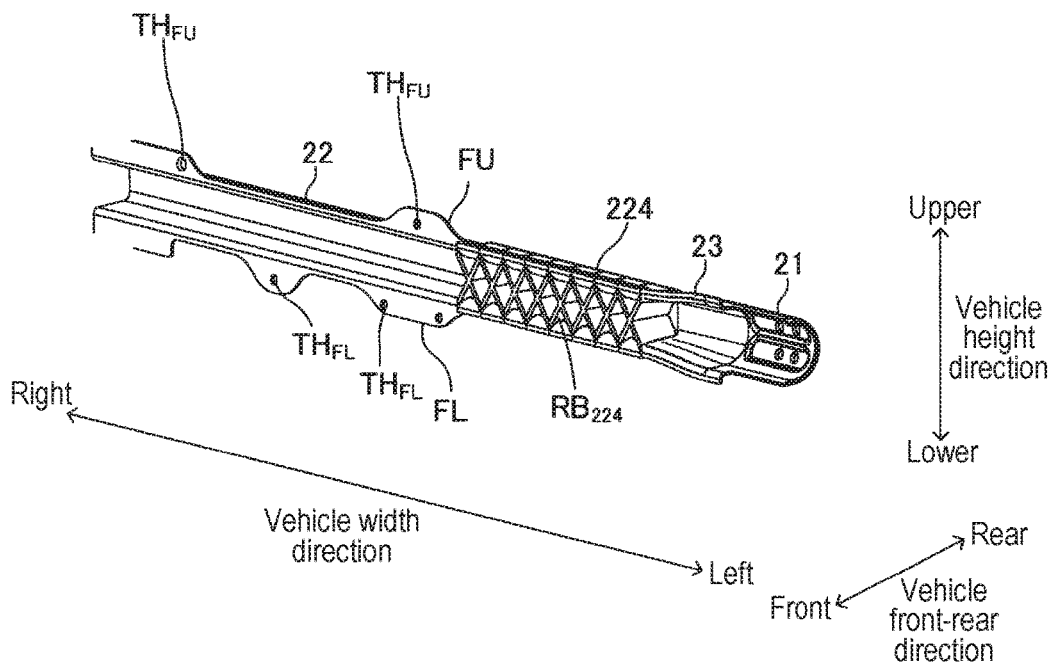
FIG. 5 is a perspective view of the groove-shaped portion as seen from obliquely frontward.

The second part 22 extends in the vehicle width direction and opens frontwardly (see FIG. 4). The second part 22 is disposed at the right end portion of the groove-shaped portion 20. The groove width $w_{22}$ and the groove depth $d_{22}$ of the second part 22 are substantially constant, or unchanged in the vehicle width direction (see FIG. 7). The groove width $w_{22}$ and the groove depth $d_{22}$ of the second part 22 are less than the inner diameter of the cylindrical-shaped portion 10, and less than the groove width $w_{21}$ and the groove depth $d_{21}$ of the first part 21. The groove width $w_{22}$ is for example, 40 mm, and the groove depth $d_{22}$ is, for example, 40 mm. The second part 22 includes a bottom wall portion 221, and first and second side wall portions 222, 223.

The bottom wall portion 221 is perpendicular to a vehicle front-rear direction. The first side wall portion 222 extends frontward from an upper end of the bottom wall portion 221. The second side wall portion 223 extends frontward from a lower end of the bottom wall portion 221. The front end portion of the first side wall portion 222 is bent upward to include a flange portion FU. The front end portion of the second side wall portion 223 is bent downward to include a flange portion FL. The interior parts are mounted on the flange portions FU, FL. The shapes of the flange portions FU, FL are set so as to correspond to the shapes of mounted portions of the interior parts, respectively. That is, heights $h_{Fu}$, $h_{FL}$ of the flange portions FU, FL are not constant or unchanged in the vehicle width direction, and are set more than other parts at portions on which the interior parts are mounted (see FIGS. 4, 5, and 7). That is, a part of the flange portion FU and a part of the flange portion FL each functions as a bracket for mounting the interior parts. The flange portions FU, FL include through holes $TH_{FU}$, $TH_{FL}$ into which fasteners for fixing the interior parts are inserted.

The third part 23 extends in the vehicle width direction and opens frontwardly. The third part 23 is disposed between the first part 21 and the second part 22 of the groove-shaped portion 20, and connects the first part 21 and the second part 22 (see FIGS. 4 and 5). The shape of a cross section of the third part 23 that is perpendicular to the longitudinal direction and that is arranged at a left end is the same as the shape of a cross section of the first part 21 that is perpendicular to the longitudinal direction (see FIG. 6). The shape of a cross section of the third part 23 that is perpendicular to the longitudinal direction and that is arranged at a right end is the same as the shape of a cross section of the second part 22 that is perpendicular to the longitudinal direction (see FIG. 7). The shape of the cross section of the third part 23 that is perpendicular to the longitudinal direction gradually changes towards the right end from the left end of the third part 23. That is, the groove width and the groove depth of the third part 23 gradually decrease towards the right end from the left end of third part 23.

Figure 7:
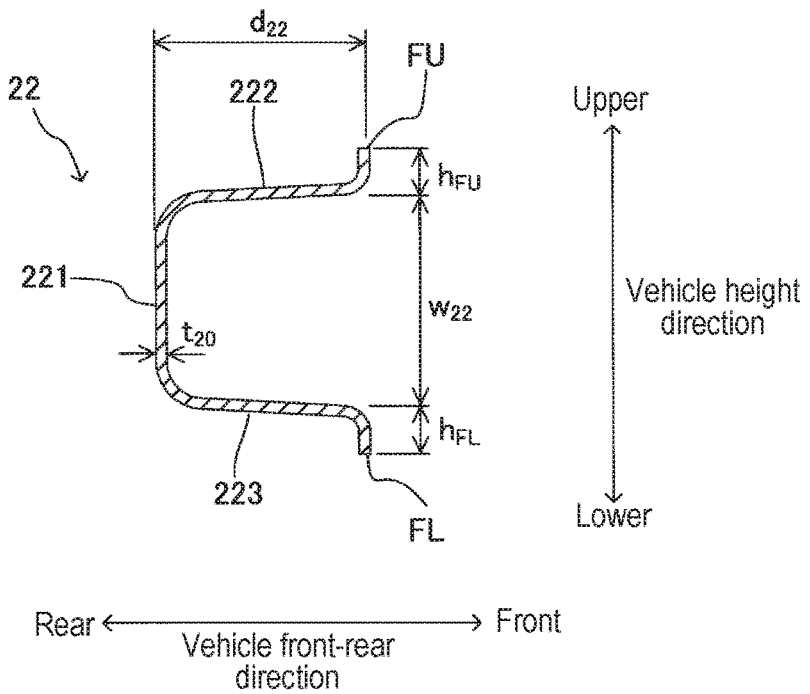
FIG. 7 is a perpendicular cross section of a second part of the groove-shaped portion in the longitudinal direction.

A plate thickness $t_{20}$ of each parts (the first part 21, the second part 22, and the third part 23) of the groove-shaped portion 20 is the same, or is constant (see FIG. 7). The plate thickness $t_{20}$ of the groove-shaped portion 20 is less than a plate thickness $t_{10}$ of the cylindrical-shaped portion 10. For example the plate thickness $t_{20}$ is 1.6 mm.

Figure 8:
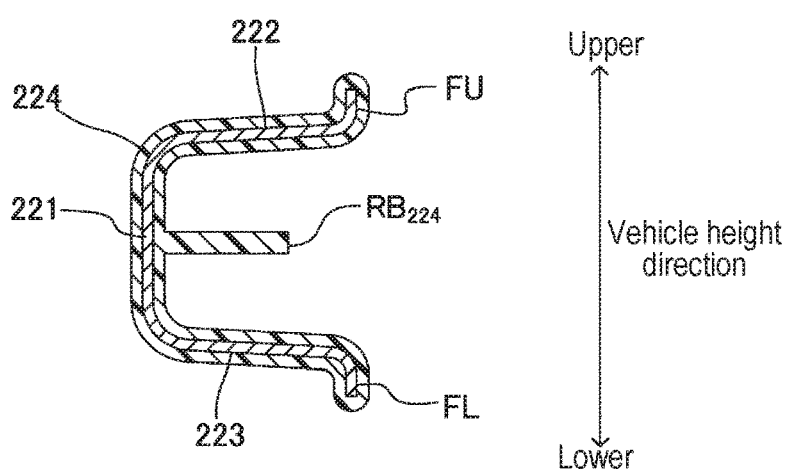
FIG. 8 is a perpendicular cross section of a part reinforced by a reinforcement member at the second part of the groove-shaped portion in the longitudinal direction (a left end portion of the second part)

A synthetic-resin-made reinforcement member 224 is mounted on a left portion of the second part 22 of the groove-shaped portion 20 (a part from the left end of the second part 22 to a center portion of the second part 22 in the vehicle width direction). The reinforcement member 224 is insert-molded relative to the second part 22. As illustrated in FIG. 8, the reinforcement member 224 covers respective surfaces of the bottom wall portion 221, the first side wall portion 222, the second side wall portion 223, the flange portion FU, and the flange portion FL. A part of the reinforcement member 224 disposed in the groove of the second part 22 (an area surrounded by the bottom wall portion 221, the first side wall portion 222 and the second wall portions 223) is provided with plural ribs $RB_{224}$ (see FIG. 5). Each of the ribs $RB_{224}$ is perpendicular to the bottom wall portion 221, and is inclined relative to the first side wall portion 222 and the second side wall portion 223. Two of the ribs $RB_{224}$ are intersected with each other at the center portions thereof.

Figure 9:
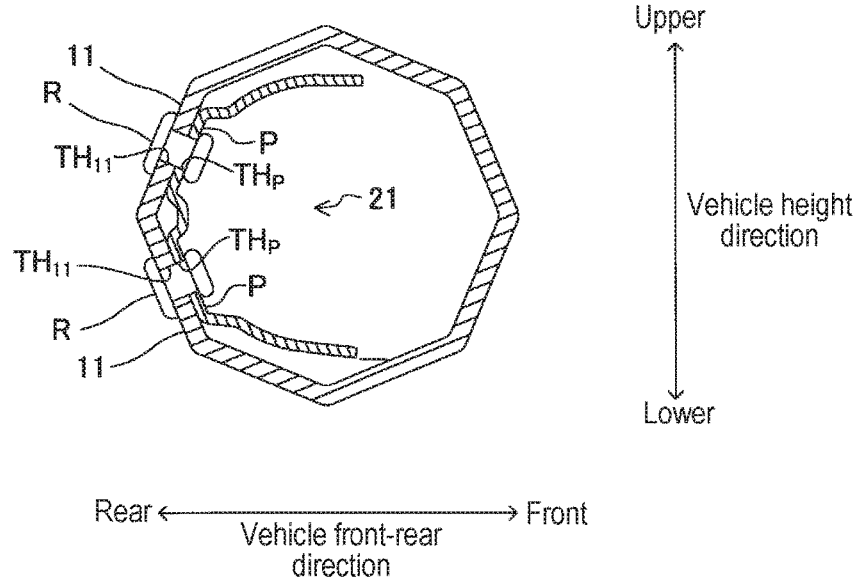
FIG. 9 is a cross-sectional view of a joint portion between the cylindrical portion and the groove-shaped portion perpendicular to the longitudinal direction.

The first part 21 of the groove-shaped portion 20 is inserted in the right end portion of the cylindrical-shaped portion 10. In a state where the positions of the through holes $TH_{11}$ and the through holes $TH_P$ are matched with each other, rivets R are inserted into the through holes $TH_{11}$ and the through holes $TH_P$. Then, distal ends of the rivets R are caulked (see FIG. 9). As such, the cylindrical-shaped portion 10 and the groove-shaped portion 20 are connected with each other. In a state where the cylindrical-shaped portion 10 and the groove-shaped portion 20 are connected with each other, the reinforcement member 224 is away from the right end of the cylindrical-shaped portion 10 by a predetermined distance (a distance slightly larger than the dimension of the third portion 23 in the vehicle width direction).

Figure 10:
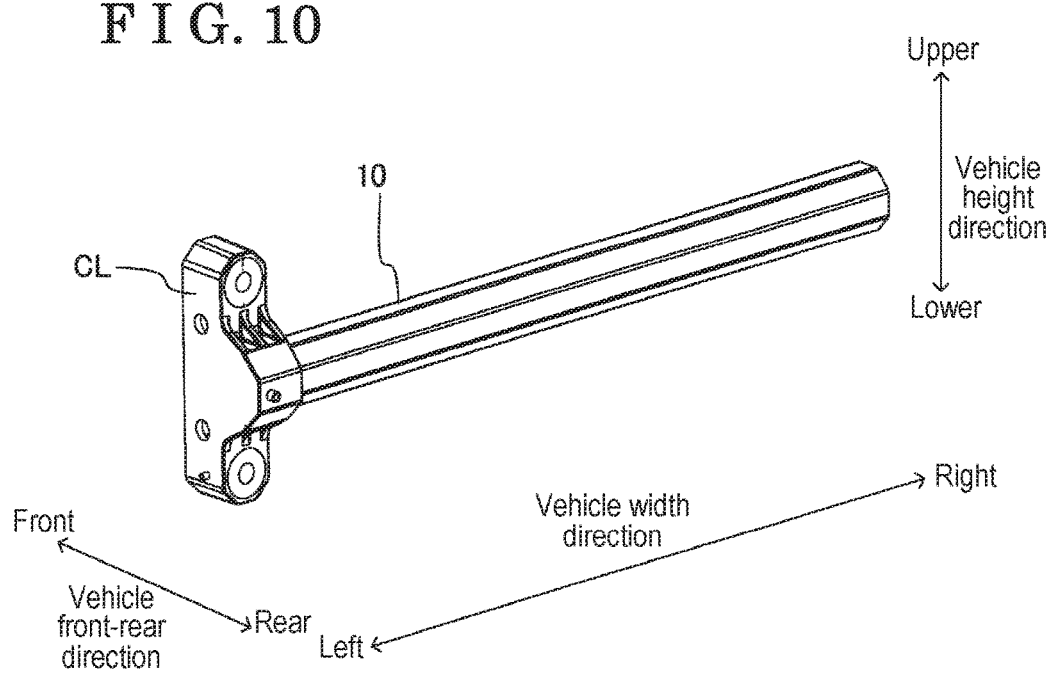
FIG. 10 is a perspective view illustrating a state where a fixture is fixed on a left end portion of the instrument panel reinforcement.
Figure 11:
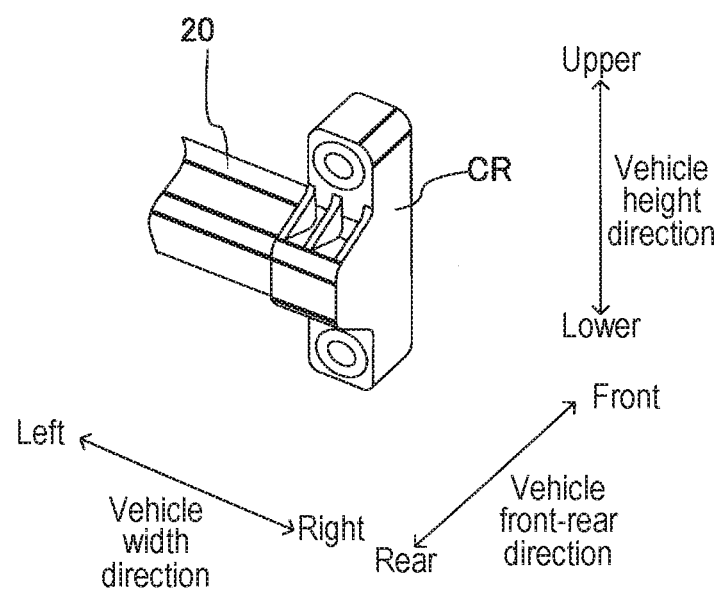
FIG. 11 is a perspective view illustrating a state where the fixture is fixed on a right end portion of the instrument panel reinforcement.

As in the conventional instrument panel reinforcement, fasteners CL, CR are mounted on a left end of the instrument panel reinforcement 1 (that is, the left end of the cylindrical-shaped portion 10) and a right end of the instrument panel reinforcement 1 (that is, the right end of the groove-shaped portion 20), respectively (see FIGS. 10 and 11). Then, the fasteners CL, CR are fixed on front pillars that are provided at the right and left of the vehicle.

As described above, the groove-shaped portion 20 (the part of the front passenger's seat side) of the instrument panel reinforcement 1 is formed thinner than the cylindrical-shaped portion 10 (the part of the driver's seat side), and therefore, the weight of the instrument panel reinforcement 1 is reduced. The part of the groove-shaped portion 20 is reinforced by the synthetic-resin-made reinforcement member 224. Relatively heavy interior parts may be mounted at the part (the left end portion of the second part 22) reinforced by the reinforcement member 224. As such, in the embodiment, only a part of the groove-shaped portion 20 that is required to maintain the strength high is reinforced by the reinforcement member 224. In the aforementioned conventional instrument panel reinforcement, because the dimension of the part of the front passenger's seat side (the part corresponding to the groove-shaped portion 20) is set by focusing on the part that is required to maintain the strength high, the weight is unnecessarily increased. On the other hand, in the embodiment, the groove width $w_{20}$ and the groove depth $d_{20}$ of the groove-shaped portion 20 is set as small as possible, and only a part required to be reinforced is reinforced by the reinforcement member 224. Accordingly, in the embodiment, the instrument panel reinforcement 1 may include the necessary and sufficient strength.

The reinforcement member 224 is away from the right end of the cylindrical-shaped portion 10 by a predetermine distance (the distance slightly larger than the dimension of the third part 23 in the vehicle width direction). The third part 23 is disposed at a front of the border portion of the driver's seat and the front passenger's seat, and the third part 23 is weaker than the cylindrical-shaped portion 10 and the left end portion of the second part 22 (the part reinforced by the reinforcement member 224). Thus, the instrument panel reinforcement 1 is bent by having the third part 23 as a starting point when the vehicle having the instrument panel reinforcement 1 collides. That is, the part disposed at the front of the driver's seat and the front passenger's seat may be inhibited from protruding to the passenger's side.

The disclosure is not limited to the aforementioned embodiment and various modifications are applied as long as the modifications do not depart from the objective to the disclosure.

For example, in the aforementioned embodiment, the reinforcement member 224 is mounted on the part from the left end of the second part 22 to the center portion of the second part 22 in the vehicle width direction. Alternatively, the mounting position of the reinforcement member 224 may be freely set in accordance with the position and the weight of the interior parts. Furthermore, the bending point of the instrument panel reinforcement 1 may be freely set when the vehicle collides by adjusting the mounting position of the reinforcement member 224. The plural reinforcement member 224 may be disposed away from one another at plural positions of the instrument panel reinforcement 1.

In the aforementioned embodiment, the reinforcement member 224 is insert-molded relative to the second part 22. Alternatively, the reinforcement member 224 and the groove-shaped portion 20 may be separately manufactured (for example by the injection molding method), and the reinforcement member 224 may be fixed to the groove-shaped portion 20 by, for example, a glue or a fastener.

In addition, in the aforementioned embodiment, for example, the cross section of the cylindrical-shaped portion 10 perpendicular to the longitudinal direction is configured to be formed in the regular octagon shape. Alternatively, the cross sectional shape of the cylindrical-shaped portion 10 is not limited to the regular octagon, and has only to be formed in a polygonal shape. In the aforementioned embodiment, the cylindrical-shaped portion 10 and the groove-shaped portion 20 are connected with each other by the rivets R. However, the connection means of the cylindrical-shaped portion 10 and the groove-shaped portion 20 is not limited to the means of the aforementioned embodiment. For example, the cylindrical-shaped portion 10 and the groove-shaped portion 20 may be connected with each other by using a bolt and a nut. Alternatively, the cylindrical-shaped portion 10 and the groove-shaped portion 20 may be welded to each other.

According to the aforementioned embodiment, the instrument panel reinforcement includes the cylindrical-shaped portion (10) being formed as a single piece, being disposed at the driver's seat side, and extending in the vehicle width direction; and the groove-shaped portion (20) being disposed at the front passenger's seat side, extending in the vehicle width direction, and opening in a predetermined direction. The instrument panel reinforcement (1) is provided for the vehicle. The groove-shaped portion (20) includes the reinforcement member (224) being made of synthetic resin and mounted on the predetermined part of the groove-shaped portion (20), the part being away from the cylindrical-shaped portion (10) by a predetermined distance.

According to the aforementioned configuration, the instrument panel reinforcement 1 includes the cylindrical-shaped portion 10 and the groove-shaped portion 20. Accordingly, comparing to a case where an instrument panel reinforcement is entirely formed in a cylindrical shape, the weight of the instrument panel reinforcement 1 may be reduced. In addition, a part of the groove-shaped portion is reinforced by the reinforcement member 224 that is made of synthetic resin. Relatively heavy interior parts may be mounted on a part reinforced by the reinforcement member 224. As such, only a part that is required to maintain the strength high is reinforced by the reinforcement member 224. As described above, in the conventional instrument panel reinforcement, because the dimension (for example, an outer diameter and a plate thickness) of the part at the front passenger's seat side (the part corresponding to the groove-shaped portion 20 in the embodiment) is set by focusing on the part required to maintain the strength high, the weight is unnecessarily increased. On the other hand, in the disclosure, the groove width and the groove depth of the groove-shaped portion 20 are set as small as possible, and only a part that is required to be reinforced is reinforced by the reinforcement member 224. Accordingly, in the disclosure, the instrument panel reinforcement may be light weighted and may include the necessary and sufficient strength.

According to the aforementioned embodiment, the groove-shaped portion (20) includes the diameter that is smaller than the diameter of the cylindrical-shaped portion (10).

According to the aforementioned configuration, the groove width and the groove depth of the groove-shaped portion 20 are set as small as possible, and only the necessary part to be reinforced is reinforced by the reinforcement member 224. Accordingly, in the disclosure, the instrument panel reinforcement may be light weighted and may include the necessary and sufficient strength.

According to the aforementioned embodiment, the groove-shaped portion (20) includes the plate thickness that is less than the plate thickness of the cylindrical-shaped portion (10).

According to the aforementioned configuration, the groove width and the groove depth of the groove-shaped portion 20 are set as small as possible, and only the necessary part to be reinforced is reinforced by the reinforcement member 224. Accordingly, in the disclosure, the instrument panel reinforcement may be light weighted and may include the necessary and sufficient strength.

According to the aforementioned embodiment, the reinforcement member (224) is insert-molded relative to the groove-shaped portion (20).

According to the aforementioned configuration, the groove width and the groove depth of the groove-shaped portion 20 are set as small as possible, and only the necessary part to be reinforced is reinforced by the reinforcement member 224. Accordingly, in the disclosure, the instrument panel reinforcement may be light weighted and may include the necessary and sufficient strength.

According to the aforementioned configuration, in addition, the reinforcement member 224 is mounted on a part away from the cylindrical-shaped portion 10 by the predetermined distance. Hereinafter, a part of the groove-shaped portion reinforced by the reinforcement member 224 is referred to as a reinforcement portion. A part of the groove-shaped portion, the part arranged between the cylindrical-shaped portion and the reinforcement portion includes a strength that is lower than those of the cylindrical-shaped portion and the reinforcement portion. Accordingly, when the vehicle having the instrument panel reinforcement of the disclosure collides, the instrument panel reinforcement is bent at a part between the cylindrical-shaped portion and the reinforcement portion as a starting point. Accordingly, in the disclosure, the bending point of the instrument panel reinforcement may be freely set by adjusting the mounting position of the reinforcement member. For example, it is favorable that the cylindrical-shaped portion is disposed at a front of the driver's seat and that the reinforcement portion is disposed at a front of the front passenger's seat. In this case, the instrument panel reinforcement is bent at a part disposed between the cylindrical-shaped portion and the reinforcement portion (a relatively low strength part) as a starting point when the vehicle collides. Accordingly, the part disposed at the front of the driver's seat and the front passenger's seat may be inhibited from protruding to a passenger's side.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An instrument panel reinforcement, comprising:
   a cylindrical-shaped portion being formed as a single piece, being disposed at a driver's seat side, and extending in a vehicle width direction; and
   a groove-shaped portion being disposed at a front passenger's seat side, extending in the vehicle width direction, and opening in a predetermined direction, wherein
   the instrument panel reinforcement is provided for a vehicle; and
   the groove-shaped portion includes a reinforcement member being made of synthetic resin and mounted on a predetermined part of the groove-shaped portion, the part being away from the cylindrical-shaped portion by a predetermined distance.

2. The instrument panel reinforcement according to claim 1, wherein the groove-shaped portion includes a diameter that is smaller than a diameter of the cylindrical-shaped portion.

3. The instrument panel reinforcement according to claim 1, wherein the groove-shaped portion includes a plate thickness that is less than a plate thickness of the cylindrical-shaped portion.

4. The instrument panel reinforcement according to claim 1, wherein the reinforcement member is insert-molded relative to the groove-shaped portion.

* * * * *